United States Patent [19]

Aurther

[11] 4,328,833
[45] May 11, 1982

[54] MULTI-PORTED VALVE WITH SEALING NETWORK BETWEEN VALVE BODY AND ROTOR

[75] Inventor: William B. Aurther, Cucamonga, Calif.

[73] Assignee: Purex Corporation, Lakewood, Calif.

[21] Appl. No.: 191,704

[22] Filed: Sep. 29, 1980

[51] Int. Cl.³ .......................................... F16K 11/085
[52] U.S. Cl. ................................ 137/625.47; 210/278; 251/317; 251/DIG. 1
[58] Field of Search ...................... 137/625.16, 625.19, 137/625.23, 625.24, 625.29, 625.47; 210/278, 425; 251/309, 310, 317, DIG. 1

[56] References Cited

U.S. PATENT DOCUMENTS

| | | | |
|---|---|---|---|
| 2,547,116 | 4/1951 | Gould | 251/309 |
| 3,295,554 | 1/1967 | Huppert | 251/317 X |
| 3,451,554 | 6/1969 | Wade | |
| 3,540,694 | 11/1970 | Cornelius | 251/310 X |
| 3,780,736 | 12/1973 | Chen | 137/625.47 X |
| 3,938,553 | 2/1976 | Ortega | |
| 4,031,918 | 6/1977 | Cagle | 137/625.47 X |

4,169,491 10/1979 Bajka.

*Primary Examiner*—Robert G. Nilson
*Attorney, Agent, or Firm*—William W. Haefliger

[57] ABSTRACT

A valve has a body containing three ports, and a rotor is rotatable in the body, the rotor rotatable about an axis to bring two passages in the rotor selectively into and out of registration with the body ports, the body ports opening at a cylindrical bore in the body, and the rotor passages opening at a cylindrical periphery of the rotor, the rotor passages spaced about said axis. The valve also includes:
(a) axially spaced seal rings extending about the axis between the rotor and the body, the rings spaced at axially opposite sides of the passages and ports,
(b) at least three seal strands extending between the rings and integral therewith, with first and second strands spaced apart about the axis at angularly opposite sides of one of the rotor passages, and the second strand and a third strand spaced apart about the axis at angularly opposite sides of the second of the rotor passages.

4 Claims, 8 Drawing Figures

U.S. Patent   May 11, 1982   4,328,833
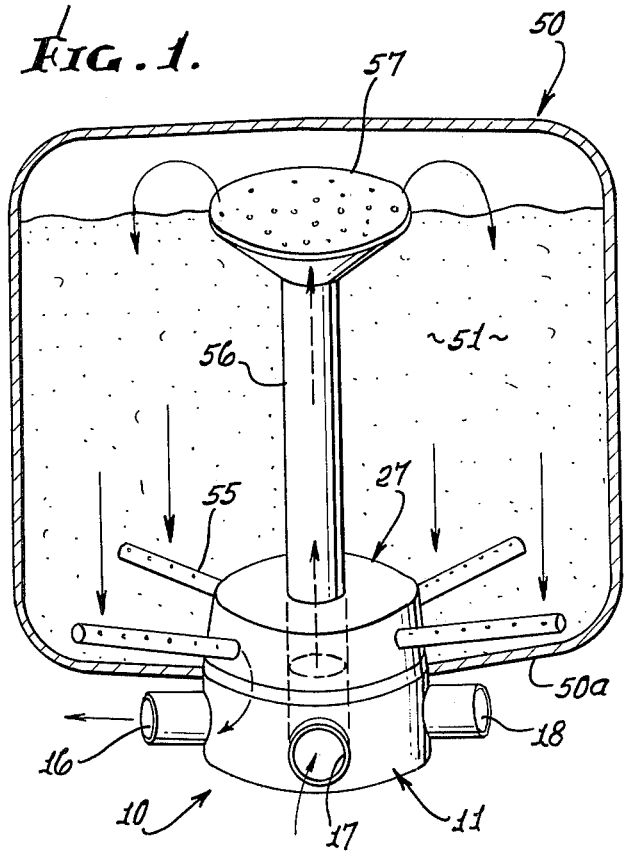
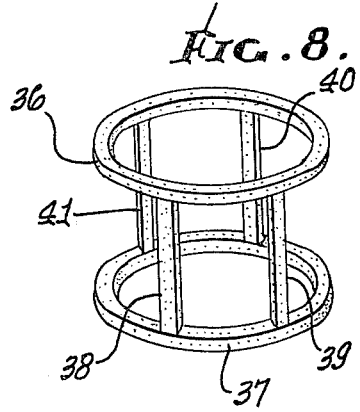
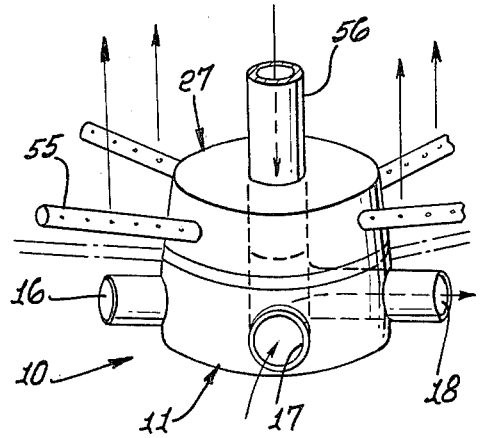
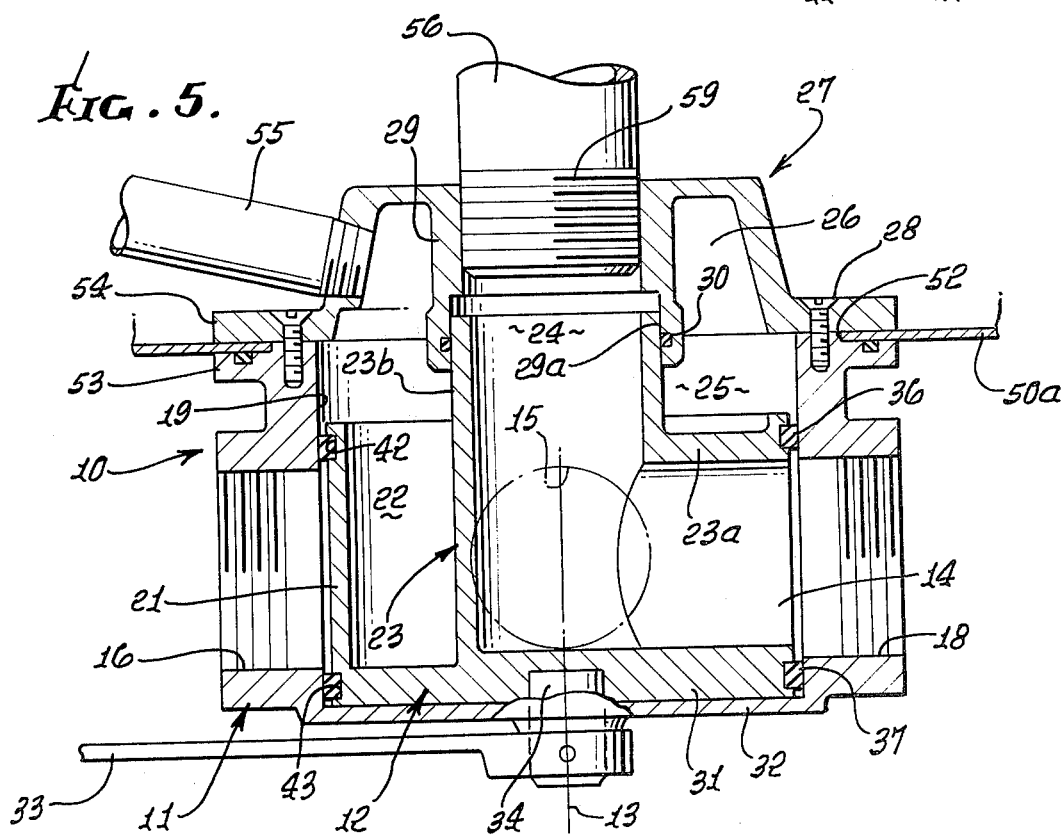

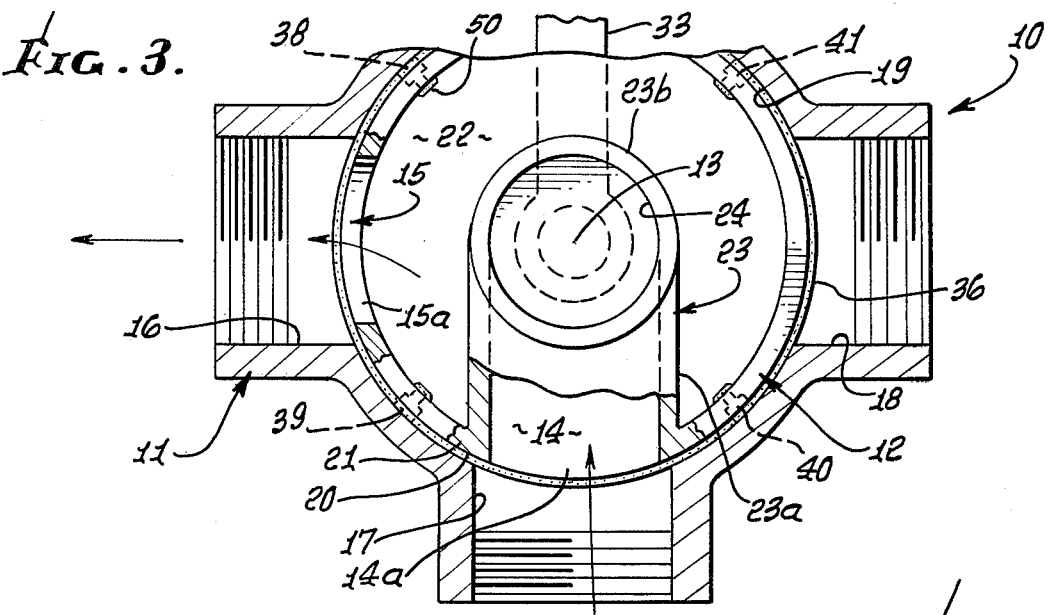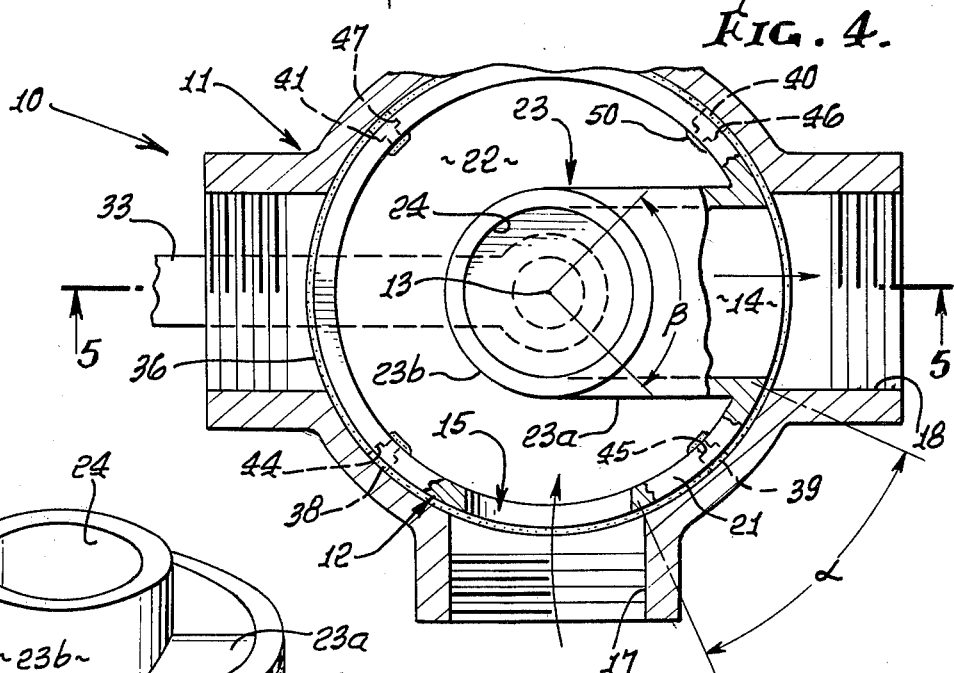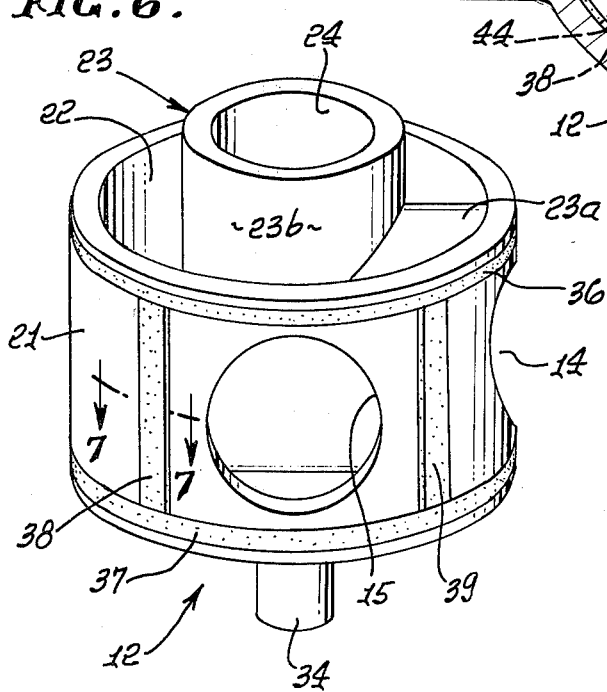

MULTI-PORTED VALVE WITH SEALING NETWORK BETWEEN VALVE BODY AND ROTOR

BACKGROUND OF THE INVENTION

This invention relates generally to valves useful for example in filtering apparatus, and more particularly concerns seal structures for such valves, which facilitate turning of valve rotors, maintain resistance to such turning, promote pressure equalization during such turning, and seal off effectively between multiple ports in a valve body in different selected rotor positions.

There is a continuing need for simplified valving devices useful in pool filtering applications, and which incorporate multiple functions as referred to, as well as facilitate long valve life, and simplified valve construction.

SUMMARY OF THE INVENTION

It is a major object of the invention to provide a valve structure meeting the above needs. Basically, the structure comprises a body containing three ports, and rotor rotatable in the body, the rotor rotatably about an axis to bring two passages in the rotor selectively into and out of registration with the body ports, the body ports opening at a cylindrical bore in the body, and the rotor passages opening at a cylindrical periphery of the rotor, the rotor passages spaced about said axis, the combination with said valve of:

(a) axially spaced seal rings extending about said axis between the rotor and the body, the rings spaced at axially opposite sides of the passages and ports, (b) at least three seal strands extending between the rings and integral therewith, first and second strands spaced apart about said axis at angularly opposite sides of one of said rotor passages, and the second strand and a third strand spaced apart about said axis at angularly opposite sides of the second of said rotor passages.

As will be seen, the seal rings and strands may form a harness or cage about the rotor and mounted in grooving in the rotor; a fourth strand may be provided between the first and third strands or maintain full engagement with the valve body bore and provide desired resistance to rotor turning between selected positions; the strands may be located at or about 90° intervals about the rotor axis; the strands may be spaced apart angularly to allow momentary intercommunication between circularly successive ports in the body, as the rotor turns; the strands may have local mechanical attachment to the rotor while the seal rings and remainder of the strands are free to float to accommodate to the body bore to best sealing fit advantage; and the valve may be attached to a filter vessel to accommodate to filtering and backwash modes of operation.

These and other objects and advantages of the invention, as well as the details of an illustrative embodiment, will be more fully understood from the following description and drawings in which:

DRAWING DESCRIPTION

FIG. 1 is a diagrammatic view of apparatus incorporating the invention;

FIG. 2 is a perspective view of a valve shown in FIG. 1;

FIG. 3 is a plan view, in section, of the FIG. 2 valve, in one position of the valve rotor;

FIG. 4 is a view like FIG. 3 but showing the valve in another rotated position;

FIG. 5 is an elevational view, in section, of the FIG. 2 valve;

FIG. 6 is a perspective view of the FIG. 2 valve rotor and seal structure thereon;

FIG. 7 is an enlarged horizontal fragmentary section, taken on lines 7—7 of FIG. 6; and FIG. 8 is a perspective view of the seal structure.

DETAILED DESCRIPTION

In FIGS. 2-6, a valve 10 has a body 11 and rotor 12 rotatable in the body about central axis 13 to bring two passages 14 and 15 in the rotor selectively into and out of registration with ports in the body. Three such ports are designated at 16-18, and they open at a cylindrical bore 19 in the body. In the example, ports 16 and 18 are spaced at 180° about axis 13, and port 17 is spaced at 90° about axis 13, from each of ports 16 and 18.

Passages 14 and 15 open at 14a and 15a to the cylindrical periphery 20 of the rotor. The rotor may include a cylindrical wall 21 forming the two openings 14a and 15a, and extending about a hollow 22. The illustrated rotor also includes a conduit 23 which may be elbow shaped to include radial section 23a terminating at opening 14, and axial section 23b terminating at opening 24. Section 23b is substantially bounded by hollow 22, as is clear from FIG. 5 showing the hollow opening upwardly to the upper annular interior 25 of body 11, and to the annular interior 26 of cap 27 fastened at 28 to the body. That cap includes a central tubular stem 29 telescopically fitting the conduit section 23b at 29a, a seal 30 being provided therebetween and accommodating rotation of section 23b relative to stem 29 as the rotor turns.

The rotor also includes a bottom wall 31 slidably engaging the body bottom wall 32. An external handle 33 is attached to the rotor via connection 34 projecting through body wall 32.

In accordance with an important aspect of the invention, axially spaced seal rings 36 and 37 extend about the rotor, in coaxial relation, between the body and rotor. Upper ring 36 is spaced above the levels of the ports 16-18 and passages 14 and 15; and lower seal ring 37 is spaced below the levels of those ports and passages. The seal structure also includes at least three seal strands extending between the seal rings and endwise integral therewith, whereby the rings and strands define a cage or harness on the rotor. First and second of the strands 38 and 39 are spaced apart about axis 13 at opposite sides of one of the rotor side passages (passage 15 for example); and second and third of the strands 39 and 40 are spaced apart about axis 13 at opposite sides of the second of the rotor side passages (passage 14 for example). A fourth strand is shown at 41, located remotely from strands 38-40, and angularly spaced from the first and third strands. The rings 36 and 37 and strands 38-41 are typically integral, and consist of elastomeric material such as rubber carried by the rotor so as to protrude from corresponding grooves in the rotor and into the clearances between the rotor and body bore 19 to slidably engage that bore and seal off between the body and rotor.

As shown in the drawings, the seal rings and strands are preferably carried in grooves within the rotor, so as to protrude from those grooves into the clearances between the rotor and body bore 19, and also so as to sealingly engage that bore. See for example annular ring grooves 42 and 43, in FIG. 5; and see strand grooves 44–47 in FIG. 4. FIG. 7 shows that the strands may locally protrude at 48 through apertures 49 in the rotor wall 21 and may have integral buttons 50 overhanging the rotor wall inner side 21a to aid in retaining the strands and rings in position in the grooves.

It will be noted, as in FIGS. 3 and 4, that the strands 38–41 are located at about 90° intervals about axis 13, whereby in each of the rotor positions as shown in FIGS. 3 and 4, the ports 16, 17 and 18 remain mutually sealed off from one another as via clearances between the rotor and body bore; on the other hand, as the rotor is rotated, the strands 38, 39 and 40 will at times register with the ports 16, 17 and 18, so that the ports will come into momentary intercommunication (for example ports 17 and 18 will intercommunicate during part of the rotary motion of the valve rotor, and ports 16 and 17 will also intercommunicate during part of the rotary motion of the valve rotor. This enables pressure equalization between intercommunication ports during rotor turning, to aid such turning. The angular gap (as at $\alpha$) between circularly successive ports is less than the angular spacing $\beta$ between successive strands, to facilitate this result. Resistance to rotor turning is also maintained by strand 41 which continuous to fully engage the bore 19 as the rotor turns between FIGS. 3 and 4 positions. Rotor centering is aided by strand 41.

FIGS. 1, 2 and 5 shows an application of the valve 10 mounted to the bottom wall of a filter vessel 50. The latter is suitable for a pool water filter and may contain sand or other particulate material 51. The bottom wall 50a of vessel 50 contains a central opening 52, and that wall is clamped between flanges 53 and 54 associated with body 11 and cap 27.

Pipes 55 extend from the cap 27 and into the particulate 51 in the vessel, the pipes being perforated. A riser pipe 56 is threaded at 59 into the stem 29 and a perforate head 57 is carried at the top of pipe 56 to promote and distribute water flow through the filter media 51.

In filter mode (see FIG. 3), water is pumped through port 17 and via passage 14 and opening 24 upwardly into riser pipe 56, then distributed via head 57 to the filter media. The filtered water enters pipes 55, flows to interior zones 26 and 22 in the valve, and then exits via passage 15 and port 16, in FIG. 3.

In backwash mode, pressurized water enters port 17, flows via annular zones 22 and 26 (see FIGS. 4 and 5) to pipes 55, flows upwardly through the media 51 to flush same, the water with soils therein then flowing to head 57 and down the riser 56 to elbow sections 23b and 23a, to exit the valve via passage 14 and port 18.

I claim:

1. In a valve having a body containing three ports, and a rotor rotatable in the body, the rotor rotatable about an axis to bring two passages in the rotor selectively into and out of registration with the body ports, the body ports opening at a cylindrical bore in the body, and the rotor passages opening at a cylindrical periphery of the rotor, the rotor passages spaced about said axis, the combination with said valve of:
   (a) axially spaced seal rings extending about said axis between the rotor and the body, the rings spaced at axially opposite sides of the passages and ports,
   (b) at least three seal strands extending between said rings and integral therewith, first and second strands spaced apart about said axis at angularly opposite sides of one of said rotor passages, and the second strand and a third strand spaced apart about said axis at angularly opposite sides of the second of said rotor passages,
   (c) said seal rings and seal strands being carried by the rotor which contains grooving corresponding in location with and receiving said seal rings strands,
   (d) the rotor having a wall and certain of said strands having local attachment to the rotor via apertures in said wall.

2. The combination of claim 2 wherein said strands include a fourth strand angularly spaced from and located between said first and third strands.

3. The combination of claim 2 wherein said strands are located at approximately 90° intervals about said axis.

4. The combination of claim 1 wherein the strands are spaced apart angularly to allow momentary intercommunication between circularly successive ports, as the rotor turns.

* * * * *